United States Patent

Rege

(10) Patent No.: US 6,434,124 B1
(45) Date of Patent: Aug. 13, 2002

(54) ADAPTIVE SYMBOL ERROR COUNT BASED TECHNIQUE FOR CDMA REVERSE LINK OUTER LOOP POWER CONTROL

(75) Inventor: Kiran M. Rege, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/052,696

(22) Filed: Mar. 31, 1998

(51) Int. Cl.[7] .............................................. G08C 17/00
(52) U.S. Cl. ...................... 370/311; 455/522; 375/227
(58) Field of Search ................................ 370/342, 328, 370/329, 311, 331, 332, 333, 335, 389, 392; 455/1.26, 69, 446, 562, 340, 222, 249.1, 453, 514, 520, 500, 456, 462, 452, 522, 13.4; 375/222, 225, 130, 340, 150, 227, 1; 704/256; 342/368; 714/704, 774, 798, 48

(56) References Cited

U.S. PATENT DOCUMENTS

| | | | | |
|---|---|---|---|---|
| 5,216,692 A | * | 6/1993 | Ling | 375/200 |
| 5,247,470 A | * | 9/1993 | McKown et al. | 364/724.11 |
| 5,257,283 A | * | 10/1993 | Gilhousen et al. | 375/1 |
| 5,353,310 A | * | 10/1994 | Russel et al. | 375/101 |
| 5,491,717 A | * | 2/1996 | Hall | 375/205 |
| 5,528,593 A | * | 6/1996 | English et al. | 370/358 |
| 5,727,033 A | * | 3/1998 | Weaver et al. | 375/358 |
| 5,734,646 A | * | 3/1998 | Chih-Lin I et al. | 370/335 |
| 5,903,551 A | * | 5/1999 | Kingston et al. | 370/335 |
| 5,933,782 A | * | 8/1999 | Nakano et al. | 455/522 |
| 5,940,749 A | * | 8/1999 | Cho et al. | 455/249.1 |
| 5,982,760 A | * | 11/1999 | Chen | 370/335 |
| 5,991,284 A | * | 11/1999 | Willengegger et al. | 370/335 |
| 6,035,210 A | * | 3/2000 | Endo et al. | 455/522 |
| 6,084,904 A | * | 7/2000 | Wang et al. | 375/130 |
| 6,097,956 A | * | 8/2000 | Veeravalli et al. | 455/446 |
| 6,185,431 B1 | * | 2/2001 | Li et al. | 455/522 |
| 6,219,342 B1 | * | 4/2001 | Rege | 370/318 |

FOREIGN PATENT DOCUMENTS

EP            0549019 A2 *  6/1993  ......... H04L/25/03

* cited by examiner

*Primary Examiner*—David Vincent
(74) *Attorney, Agent, or Firm*—J. J. Opalach; Troutman, Sanders, LLP

(57) ABSTRACT

In a cellular system based on industry standard IS-95 CDMA (code division multiple access), a symbol error count based reverse link outer loop power control technique uses adaptive SER targets. In particular, a base station uses a $2^{nd}$ order statistic, e.g., standard deviation (variance), to identify, or act as a signature of, a particular cellular (wireless) communications environment. The base station monitors the standard deviation of the symbol error count of a received signal (transmitted from a mobile station). The target signal-to-noise ratio ($E_{bT}/N_{0T}$) of this received signal is adjusted as a function of the value of the standard deviation and the adjusted $E_{bT}/N_{0T}$ target is used to provide power control.

7 Claims, 4 Drawing Sheets

ADAPTIVE SYMBOL ERROR COUNT BASED TECHNIQUE FOR CDMA REVERSE LINK OUTER LOOP POWER CONTROL

CROSS-REFERENCE TO RELATED APPLICATIONS

Related subject matter is disclosed in the co-pending, commonly assigned, U.S. Patent application of Rege, entitled "A Non-Adaptive Symbol Error Count Based Technique for CDMA Reverse Link Outer Loop Power Control," Ser. No. 09/052581, filed on even date herewith.

FIELD OF THE INVENTION

This invention relates generally to communications and, more particularly, to wireless systems.

BACKGROUND OF THE INVENTION

It is well known that power control is critical for CDMA (code division multiple access) wireless systems such as those based on the IS-95 standard (e.g., see Holtzman, J. M., "CDMA Power Control for Wireless Networks," in *Third Generation Wireless Information Networks*, S. Nanda and D. J. Goodman (eds), Kluwer Academic Publishers, Boston, Mass., 1992; and TIA/EIA/IS-95 Interim Standard, *Mobile Station—Base Station Compatibility Standard for Dual-Mode Wideband Spread Spectrum Cellular System*, Telecommunication Industry Association, July 1993). The ultimate objective of power control in CDMA systems is to achieve a desired speech quality on a particular link at a minimum transmit power level. Without effective power control, the capacity gains expected from a CDMA wireless system will not be realized. This is especially true for the reverse link (uplink) of a CDMA system (i.e., from a mobile station to a base station). Unless the transmit power of the mobile station is tightly controlled, the reverse link will not be able to operate at or near its potential capacity in a cellular communications environment (e.g., fading, etc.).

Realizing the importance of power control for the reverse link, the IS-95 standard has provided for a power control scheme known in the art as "inner loop power control." In this scheme, a base-station transmits a 1-bit feedback signal to a mobile station every 1.25 milliseconds (ms). The 1-bit value of this feedback signal is representative of whether an estimate of the instantaneous signal-to-noise ratio ($E_b/N_0$) of the received signal at the base station (transmitted from the mobile station) exceeds, or falls below, a target signal-to-noise ratio $E_{bT}/N_{0T}$. Correspondingly, when the mobile station receives this feedback signal, the mobile station raises its transmit power by 1 dB or lowers it by 1 dB depending on the value of the feedback bit. Thus, the inner loop power control scheme provided by the IS-95 standard helps maintain the signal-to-noise ratio of the received signal at the base-station close to the target $E_{bT}/N_{0T}$.

As noted above, the ultimate objective of a power control scheme in the context of CDMA systems is to achieve a desired speech quality on a particular link at a minimum transmit power level. A simple, quantifiable, measure of the speech quality on a link is the associated frame error rate (FER) on that link. For CDMA systems based on IS-95, the desired speech quality can be said to have been achieved on a link if the FER is at or below a certain level (e.g., 1%). For a given fading environment, the FER is a function of the average $E_b/N_0$ at the receiver. Since, as described above, inner loop power control helps maintain the receiver $E_b/N_0$ close to the target $E_{bT}/N_{0T}$, the FER is, ultimately, determined by the target $E_{bT}/N_{0T}$. Therefore, to achieve the desired speech quality in a given fading environment, the target $E_{bT}/N_{0T}$ needs to be set at a level which is appropriate for that environment.

Unfortunately, there is no fixed $E_{bT}/N_{0T}$ target that achieves the desired FER in all fading environments. Therefore, those in the art have developed an adaptive mechanism that adjusts the target $E_{bT}/N_{0T}$ accordingly. This mechanism, referred to hereafter as "Reverse Outer Loop Power Control" (ROLPC) monitors the FER and changes the target $E_{bT}/N_{0T}$ depending on whether the FER is below, or above, a desired threshold. By directly using the FER to drive the target $E_{bT}/N_{0T}$, the current ROLPC achieves its objective very well in reasonably steady fading environment. However, since the FER monitoring process implicit in this technique is rather slow (with time constants of the order of a couple of seconds), its performance can deteriorate in a dynamic environment with rapidly changing fading characteristics.

As such, in order to improve the speed of the ROLPC, the commonly assigned U.S. patent application of Carl Weaver and Wei Peng, entitled "Symbol Error Based Power Control For Mobile Telecommunication System," Ser. No. 08/346800, filed Nov. 30, 1994, describes a symbol error (SE) based technique which potentially improves the performance of ROLPC in a dynamic fading environment. This Fixed SE rate (SER) target ROLPC technique, which is based on the premise that the SER and FER are strongly correlated, tries to maintain the SER close to a pre-determined fixed target SER value. Thus, after every frame the associated symbol error count is compared with the target SER and the $E_{bT}/N_{0T}$ target is raised or lowered depending upon whether the symbol error count was above or below the SER target. The updated $E_{bT}/N_{0T}$ target is used to generate inner loop feedback bits during the next frame.

SUMMARY OF THE INVENTION

The above-mentioned Fixed SER target ROLPC technique uses a fixed SER target for the mean value of SER. Notwithstanding the performance improvements possible with the above-mentioned Fixed SER target ROLPC technique, I have observed that the correlation between the SER and FER varies across different cellular communications environments. In fact, for a given (fixed) SER target, the FERs in different fading environments can differ by an order of magnitude. In other words, the above-mentioned Fixed SER target ROLPC technique cannot maintain the FER close to the target in different fading environments. As such, in order to achieve a desired FER, different environments require different SER targets. Therefore, and in accordance with the invention, I present a symbol error count based ROLPC technique with adaptive SER targets. As a result, the inventive concept provides a symbol error (SE) based ROLPC technique that achieves desired FER under different fading conditions.

In an embodiment of the invention, a base station uses a $2^{nd}$ order statistic, e.g., standard deviation (variance), to identify, or act as a signature of, a particular cellular (wireless) communications environment. The signature is used to set a target symbol error rate appropriate for the current environment. The $E_{bT}/N_{0T}$ target is adjusted as a function of a comparison of the symbol error count with a dynamically adjusted SER target. The base station monitors the standard deviation of the symbol error count of a received signal (transmitted from a mobile station). The $E_{bT}/N_{0T}$ target is adjusted as a function of the value of the standard deviation. The adjusted $E_{bT}/N_{OT}$ target is used to provide power control.

As a result, the inventive concept provides a technique to control FER in a variety of cellular communications environments and, at the same time, keep the performance benefits of a SER based technique.

DETAILED DESCRIPTION

Figure 1:
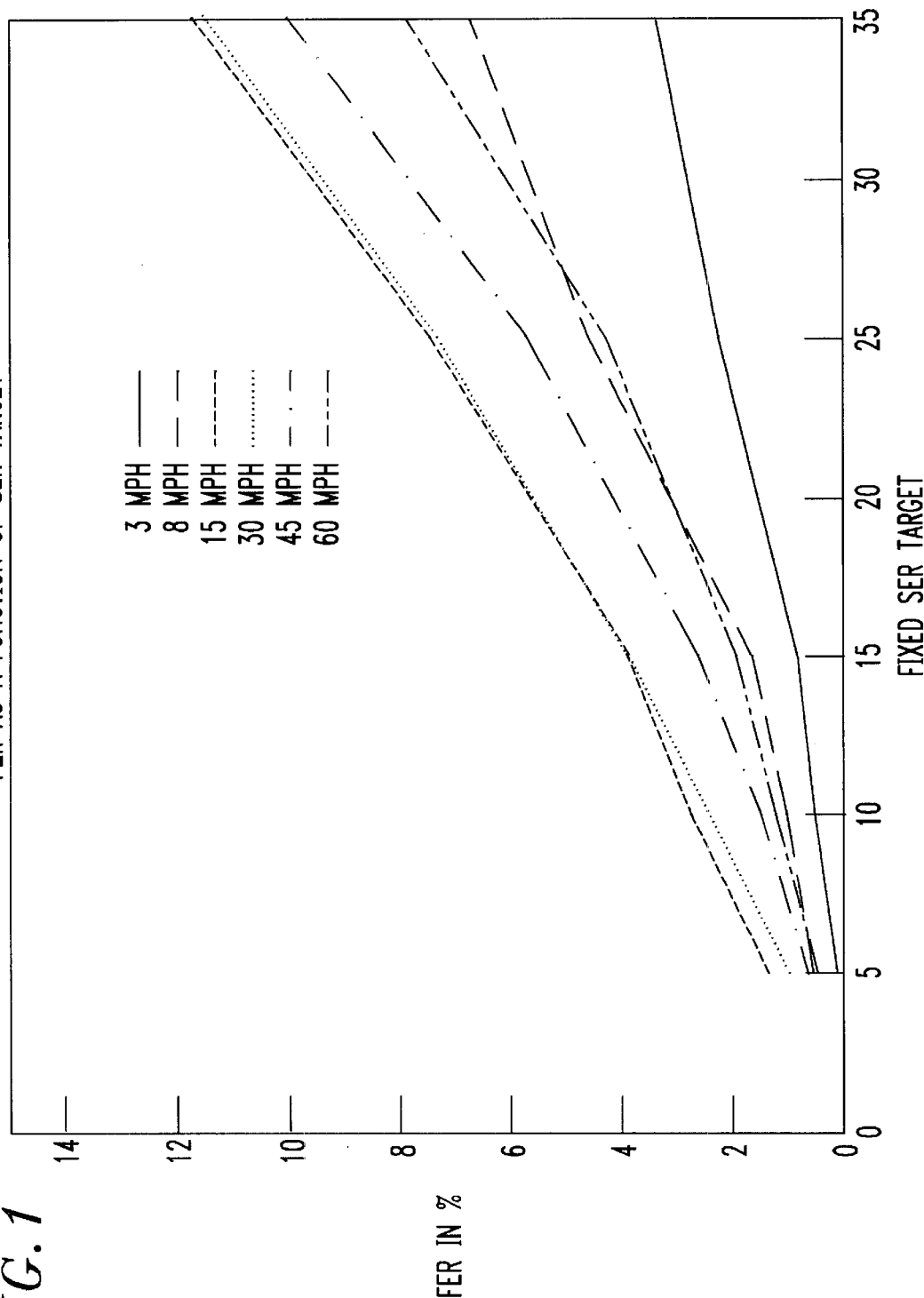
FIGS. 1–3 show simulation results for Fixed SER target ROLPC in different fading environments.

Before describing the inventive concept, a short description of the above-mentioned Fixed SER target ROLPC technique is provided. Following this section, the performance results of a simulation of the Fixed SER target ROLPC technique is shown upon which the inventive concept is based. After this performance-related section, the inventive concept is presented.

Fixed SER Target ROLPC

The core of this technique, assuming only full rate frames have been received and that no erasures have occurred, is described below. (It should be noted that dealing with partial rate frames and frame erasures leading to the loss of the rate estimate can be done in a number of ways. For example, partial rate frames could use smaller step sizes for making changes in the $E_{bT}/N_{OT}$ target, and, if the rate information is unavailable because of a frame erasure, the last available rate parameter may be used as an estimate for the current frame rate.)

The following definitions are used:

$T_{SE}$=fixed SER target;

$(T_{E_{bT}/N_{OT}})_n$=the $E_{bT}/N_{OT}$ target (in dB) for the $n^{th}$ frame;

$\Delta$=the basic full rate step size, also in units of dB;

$A_O=0, A_1, \ldots, A_{K-1}$ and $A_K=\infty$ are a strictly increasing sequence of integers;

$M_1, M_2, \ldots, M_K$ are another sequence of strictly increasing positive weight values;

$SE_n$=the symbol error count generated by the $n^{th}$ frame, which is provided by the receiver portion of the base station;

$E_{max}$=Upper limit on the $E_{bT}/N_{OT}$ target (in dB);

$E_{min}$=Lower limit on the $E_{bT}/N_{OT}$ target (in dB); and $d_n, L_n$, are variables, or parameters.

The Fixed SER target ROLPC technique adjusts the $E_{bT}/N_{OT}$ target in the following manner:

$$d_n = SE_n - T_{SE}; \quad (1)$$

$$\text{sgn}(d_n) = \text{Sign of } d_n; \quad (2)$$

$$\text{if } d_n = 0 \text{ then let } L_n = 0; \quad (3)$$

$$\text{Else if } A_{k-1} < |d_n| \leq A_k \text{ for some } k > 0, \text{ Let } L_n = M_k; \quad (4)$$

$$(T_{E_{bT}/N_{OT}})_{n+1} = (T_{E_{bT}/N_{OT}})_n + \text{sgn}(d_n) L_n \Delta; \quad (5)$$

$$\text{if}(T_{E_{bT}/N_{OT}})_{n+1} > E_{max}, (T_{E_{bT}/N_{OT}})_{n+1} = E_{max}; \text{ and} \quad (6)$$

$$\text{if}(T_{E_{bT}/N_{OT}})_{n+1} < E_{min}, (T_{E_{bT}/N_{OT}})_{n+1} = E_{min}. \quad (7)$$

In step (1) of the above technique, initially the variable, $d_n$, is set equal to the difference between the symbol error count generated by the $n^{th}$ frame, $SE_n$, and the target symbol error rate for the $n_{th}$ frame, $T_{SE}$. In step (2), the function sgn($d_n$) is set equal to the sign of the variable, $d_n$. In step (3), if the value of the variable, $d_n$, is equal to zero, then the variable, $L_n$, is also set equal to zero and execution proceeds to step (5), described below. However, if the value of the variable, $d_n$, is not equal to zero, then the magnitude of the variable $d_n$ is compared to a plurality of intervals, $A_k$, in step (4). The parameters $A_0=0, A_1, \ldots, A_{K-1}$ and $A_K=\infty$, define intervals such that if the magnitude of the difference between the actual symbol error count $SE_n$ and the target $T_{SE}$ falls in the, say, $k^{th}$ interval, the variable $L_n$ is set equal to the corresponding weight $M_k$ (illustrative values for these variables are given below). In step (5), the $E_{bT}/N_{OT}$ target is updated for the next frame, n+1, by adjusting the current $E_{bT}/N_{OT}$ target by the basic step size $\Delta$ multiplied, as shown, by the value of the variable $L_n$. This allows one to make large or small changes in the $E_{bT}/N_{OT}$ target depending on the magnitude of the difference between the actual symbol error count and the symbol error target. In steps (6) and (7), the $E_{bT}/N_{OT}$ target for the next frame is limited by the respective upper and lower limit values.

Performance of Fixed SER Target ROLPC

Figure 2:
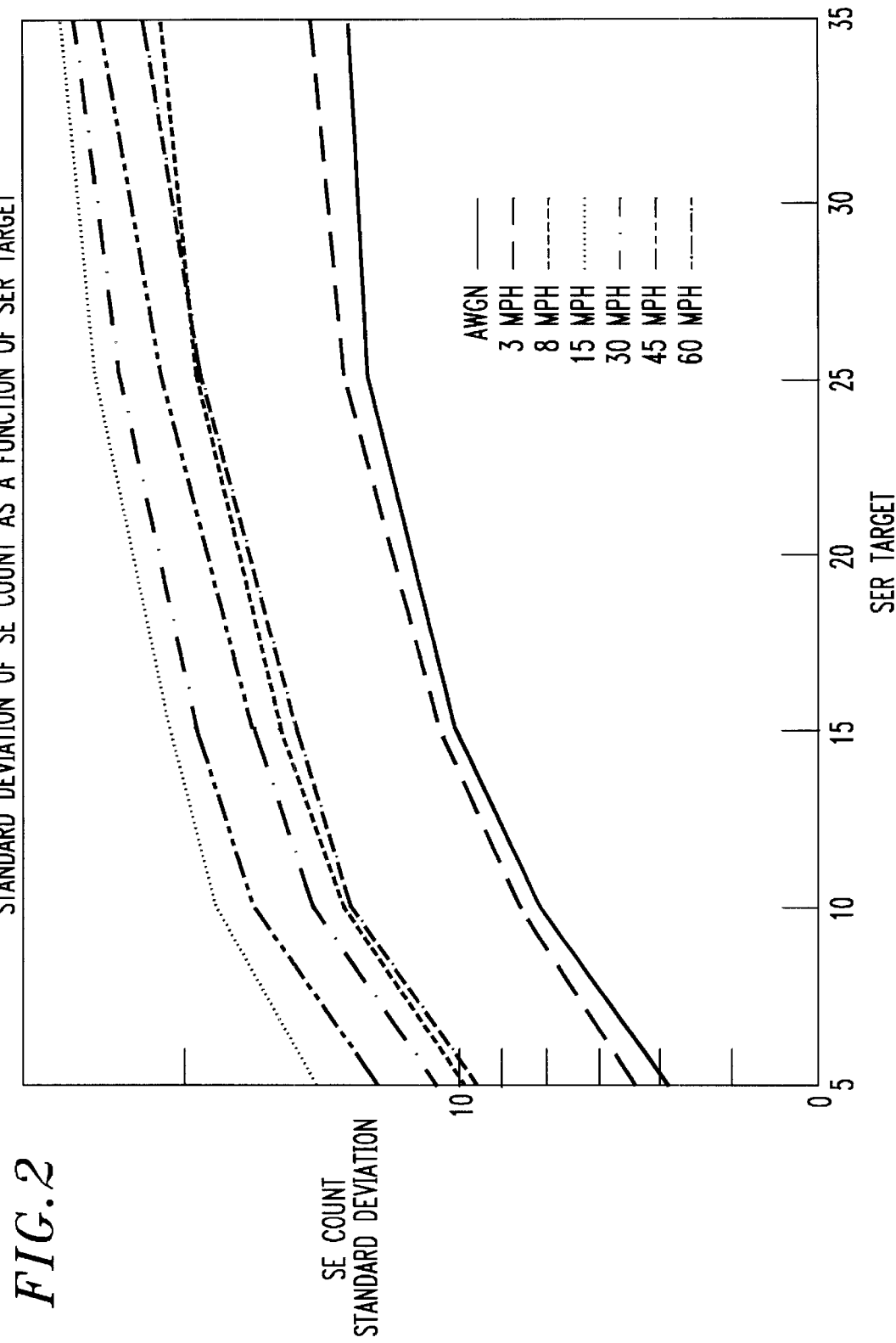
Figure 3:
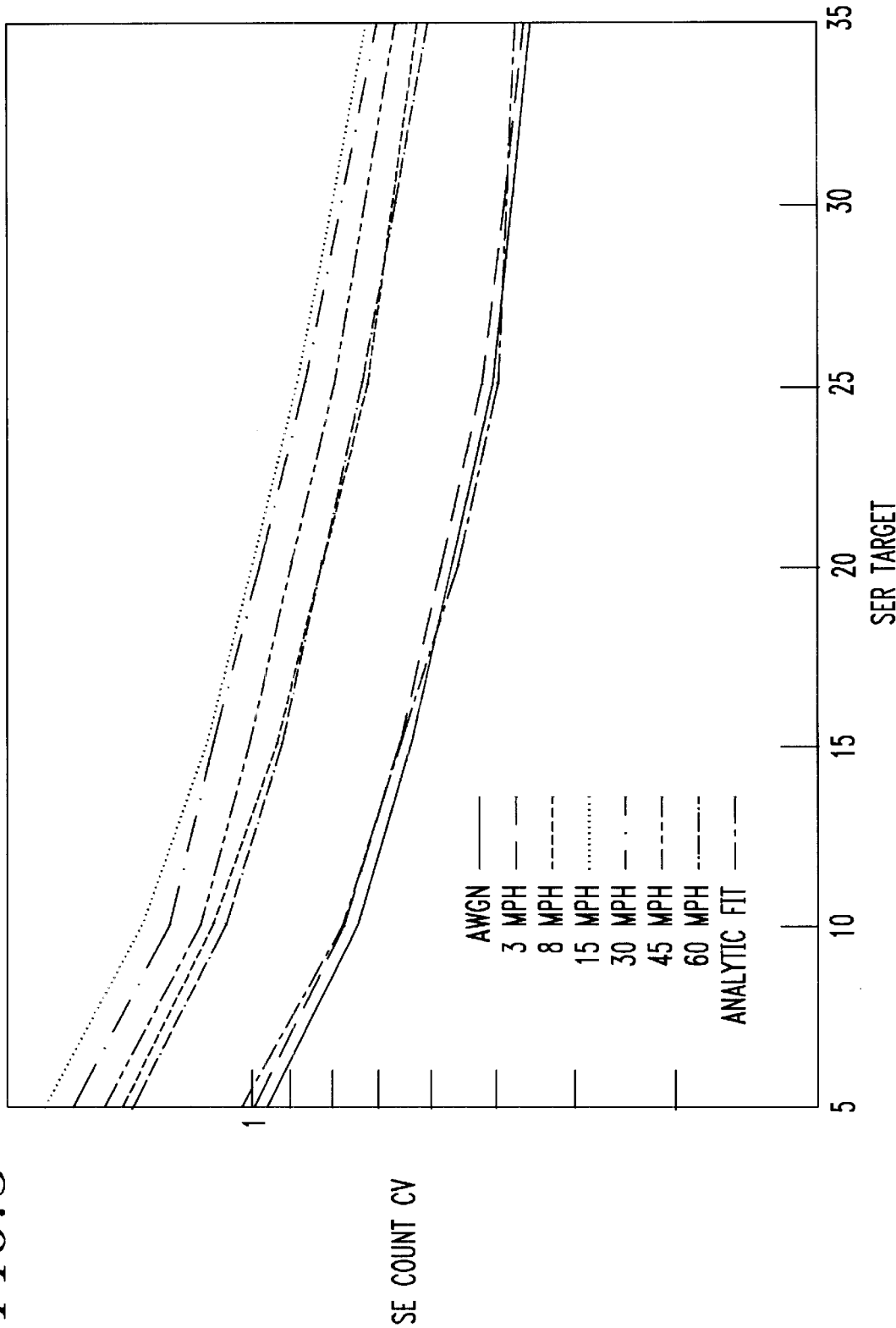

An illustrative set of performance results of a simulation of the Fixed SER target ROLPC technique under different fading conditions and at different values of the (fixed) SER target $T_{SE}$ are shown in FIGS. 1–3. The logarithmic scale has been deliberately used to highlight the variation in these performance metrics.

This simulation used the following set of parameters values:

$A_0=0, A_1=10, A_2=25,$ and $A_3=\infty$;

$M_1=1, M_2=2,$ and $M_3=4$;

$\Delta=0.01$ dB;

$E_{max}=10.5$ dB; and $E_{min}=3$ dB.

And incorporated the following list of assumptions.

The base-station receiver was assumed to be connected to two antennas, each receiving one multipath of the reverse link transmissions, with a RAKE receiver finger, as known in the art, locked to each multipath.

The fading on the two multipaths was assumed to be independent with Rayleigh distribution. Jakes'construction (e.g., see Jakes, W. C., *Microwave Mobile Communications,* Wiley, New York, 1974) was used to generate this fading phenomenon with its speed dependent correlation properties.

All other interference, thermal noise, etc. was modeled as an independent white Gaussian noise process.

A bit (coded symbol) level simulation of the Viterbi decoder/interleaver combination in which the soft decision metrics were generated according to the logic described in Chapter 4 of "*CDMA Principles of Spread Spectrum Communications,*" by A. J. Viterbi, was incorporated into the overall simulation testbed.

Inner loop control was explicitly modeled—the $E_b/N_O$ estimator used in the inner loop was assumed to be perfect. A 5% error rate was assumed on the inner loop feedback bits. The $E_b/N_O$ estimator was assumed to compute the average per antenna $E_b/N_O$ by summing the instantaneous $E_b/N_O$ values for each active RAKE finger and then dividing the sum by 2 in the linear—not dB—domain.

Different fading conditions were created by varying the mobile speed from 3 MPH to 60 MPH. In addition, the AWGN environment was also included in this study for the sake of completeness. The value of the SER target was also varied from 5 to 35 to study the impact of this parameter.

FIG. 1 shows the frame error rate as a function of the (fixed) SER target for different fading environments. From FIG. 1, it can be observed that no single fixed SER target will be able to maintain the frame error rate close to the desired value across the various fading environments considered here. This is because although the SER and FER are strongly correlated with each other, they do not share a nearly deterministic relationship that holds across different fading environments. The reason for this can be traced to the interaction between the inner loop control, the interleaver and the fading environment which gives rise to different symbol error distributions at different mobile speeds. Consequently, even for comparable symbol error rates, different environments can witness widely different frame error rates because of the underlying symbol error distributions.

FIGS. 2 and 3 respectively show the standard deviation of the symbol error count and the coefficient of variation (i.e. the ratio of the standard deviation to the mean) of the symbol error count as functions of the (fixed) SER target for different fading environments. FIGS. 2 and 3 present an intriguing fact: Across the wide range of SER targets considered in this study, the curves depicting the relationship between the standard deviation of SE count (or the coefficient of variation of SE count) and the (fixed) SER target for different fading environments are parallel to each other on a logarithmic scale! That is, the ratios of the standard deviation of SE count corresponding to different fading environments remain constant at all values of the SER target that may be of interest. The same can be said of the coefficient of variation of symbol error count (referred to herein as CV). This happens in spite of the fact that these quantities (standard deviation of SE count or SE count CV) display a wide variation across environments and SER target values. Moreover, it can be observed from FIGS. 1 and 2 (or 1 and 3) that if two fading environments have comparable SE count standard deviation for any fixed SER target, their FER characteristics are also fairly close. Thus, and in accordance with the inventive concept, the SE count standard deviation (or variance or SE count CV) can be used to identify the fading environment so that the SER target can be set at a level likely to achieve the desired FER in that environment. This will ensure that the resulting FER is close to the desired frame error rate. Changes in the fading environment will be reflected in the standard deviation of the SE count, which, in turn, will result in changes in the SER target. (It should be noted that the above-mentioned co-pending, commonly assigned, U.S. Patent application of Rege, entitled "A Non-Adaptive Symbol Error Rate Based Technique for CDMA Reverse Link Outer Loop Power Control," presents an alternative non-adaptive SER based reverse link outer loop power control that also achieves the desired FER under a variety of fading environments.)

An Adaptive SER Based ROLPC

As a result of the above observations on the performance of the Fixed SER target ROLPC approach in different communications environments, I present a symbol error count based ROLPC technique with adaptive SER targets. As a result, the inventive concept provides an SE count based ROLPC technique that achieves desired FER under different fading conditions.

Figure 4:
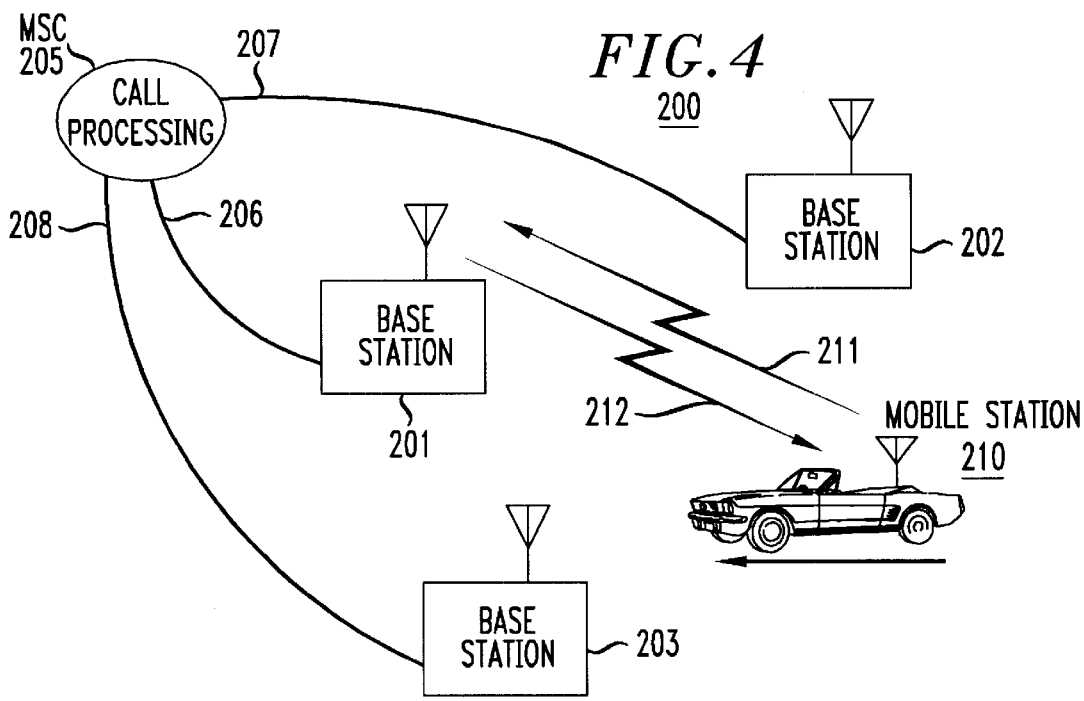
FIG. 4 shows a portion of a mobile communications system embodying the principles of the invention.

Turning now to FIG. 4, a portion of a CDMA mobile communications system 200 embodying the principles of the invention is shown. Other than the inventive concept, the elements shown in FIG. 4 are well-known and will not be described in detail. For example, although shown as a single block element, base station 201 includes stored-program-control processors, memory, and appropriate interface cards. Except as noted below, it is assumed that the CDMA mobile communications system conforms to industry standard IS-95. Portion 200 comprises mobile switching center (MSC 205), which (among other things) provides call processing; three base stations: 201, 202, and 203; and a mobile station 210, which is illustratively represented by a vehicle icon. The three base stations and the mobile station are representative of wireless endpoints. Each base station is coupled to MSC 205 over respective land-line facilities, 206, 207, and 208. For the purposes of the remainder of this description, it is assumed that mobile station 210 is in communications with base station 201, via downlink signal 212 and uplink signal 211.

Figure 5:
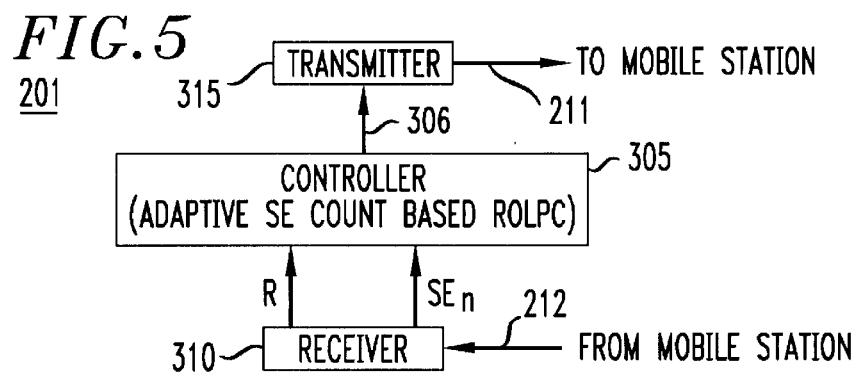
FIG. 5 shows a portion of a base station embodying the principles of the invention.

In accordance with the inventive concept, base station 201 performs adaptive SE count based ROLPC on the received signal 211 from mobile station 210. FIG. 5 shows a portion of base station 201 embodying the principles of the invention. Other than the inventive concept, the elements shown in FIG. 5 are well-known and will not be described in detail. For example, controller 305 is representative of a stored-program-controlled processor with associated memory as known in the art. Also, only that portion of base station 201 related to the inventive concept is shown, e.g., other processing by receiver 310 of the received signal is not described. Base station 201 comprises controller 305 (also referred to herein the base station processor), receiver 310, and transmitter 315. Receiver 310 receives the uplink signal, 211, and provides to controller 305 two signals: R, which is the reciprocal of the rate of the frame just processed by receiver 310 and is equal to 0 if there is an erasure so that the rate information is lost; and $SE_n$, which is the symbol error count generated by the $n^{th}$ frame. In accordance with the Adaptive SE count based ROLPC technique, controller 305 carries out computations to update the symbol error target and the $E_{bT}/N_{OT}$ target for the next frame after receiver 310 has just finished processing a current frame. Controller 305 also controls transmitter 315 for providing the above-mentioned feedback signal to mobile station 210 for controlling the transmit signal level of mobile station 210. (As noted earlier, when the mobile station receives this feedback signal, the mobile station raises its transmit power by 1 dB or lowers it by 1 dB depending on the value of the feedback bit.)

Before describing the details of the adaptive SE count based ROLPC technique, the core of this approach is described below and shown in FIG. 6. It is assumed that only full rate frames are transmitted and that the rate information is not lost. (As mentioned above, partial rate frames and frame erasures can be handled in a number of ways. For example, partial rate frames could use smaller step sizes for making changes in the $E_{bT}/N_{OT}$ target, and, if the rate information is unavailable because of a frame erasure, the last available rate parameter may be used as an estimate for the current frame rate.)

The Adaptive SER based ROLPC technique monitors the following additional variables:

$\overline{SER_n}$=estimated average SER after the $n^{th}$ frame;

$\overline{SER^2_n}$=estimated average square of SER after the $n^{th}$ frame; and $\overline{T_{SE_n}}$=estimated average symbol error target after the $n^{th}$ frame.

The following are definitions for some key relationships.

$f(T_{SE})$: A reference symbol error CV characteristic showing the relationship between the symbol error CV and the symbol error target for a fixed environment such as AWGN under the basic control algorithm with a constant SER target. ($f(T_{SE})$ is determined empirically or analytically.)

$S_{ref}$: The SER target which achieves the desired FER under the reference environment used in the determination of $f(T_{SE})$ using the basic control algorithm with a constant SER target. This is also determined empirically and stored.

$g(x)$: Another empirically determined relationship between the ratio of the target SERs that achieve the desired FER under two fading environments and the ratio of the corresponding SE count CVs. That is, if $T_1$ and $T_2$ are SER targets that achieve the desired FER under environments 1 and 2 respectively, and if $CV_1$ and $CV_2$ are the corresponding SE count CV values, then $g(.)$ represents the relationship:

$$\frac{T_1}{T_2} = g\left(\frac{CV_1}{CV_2}\right).$$

This relationship may be determined using regression techniques. To determine this relationship one may use the reference environment as environment 2 and then substitute different fading environments for environment 1 to obtain different points of this curve. The above relationship may then be written as:

$$\frac{T_1}{S_{ref}} = g\left(\frac{CV_1}{CV_{ref}}\right),$$

where $CV_{ref}$ is the symbol error CV under the reference environment when the fixed SER target is set at $S_{ref}$.

Figure 6:
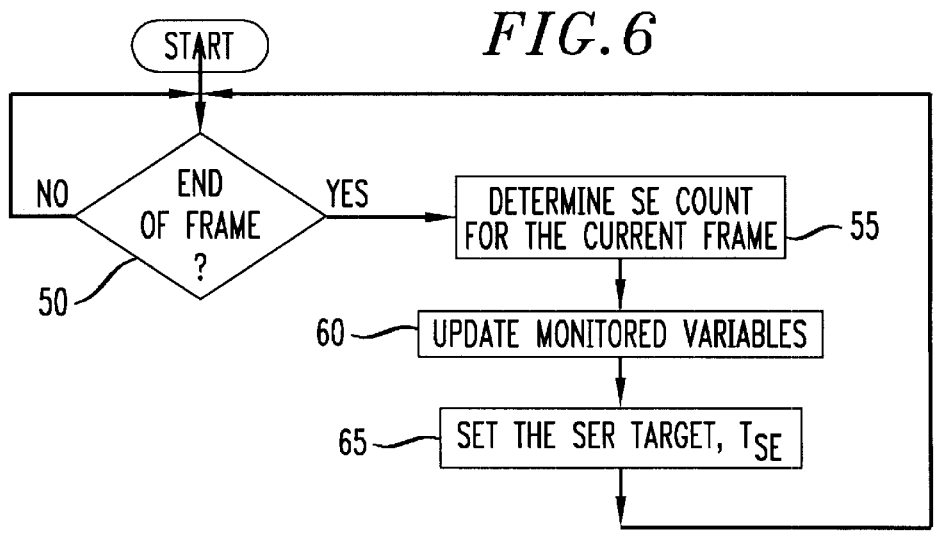
FIG. 6 shows an illustrative flow chart embodying the principles of the invention.

Referring to FIG. 6, an illustrative high-level representation of an adaptive SE count based ROLPC process is shown in accordance with the principles of the invention. In step 50, the adaptive SE count based ROLPC process waits for the end of every frame (e.g., that the $n^{th}$ frame has just ended). At the end of every frame, the resulting symbol error count, $SE_n$, is determined in step 55, by e.g., receiver 310 of FIG. 5. In step 60, the values of the above-described monitored variables are updated by, e.g., controller 305 of FIG. 5, as a function of the symbol error count, $SE_n$. In step 60, the following equations are used by controller 305 to carry out these updates:

$\overline{SER_n}=(1-\alpha)\overline{SER_{n-1}}+\alpha SE_n;$ $\overline{SER^2_n}=(1-\alpha)\overline{SER^2_{n-1}}+\alpha SE^2_n;$ and $\overline{T_{SE_n}}=(1-\alpha)\overline{T_{SE_{n-1}}}+\alpha T_{SE_n};$ where $\alpha$ is a suitable filter constant, e.g., 0.2. (The above equations are simple single-pole IIR (infinite impulse response) filters used to derive estimates of the corresponding averages. Other averaging techniques can also be used in place of these filter equations.)

In accordance with the inventive concept, in step 65 the SER target, $T_{SE}$, is set using the updated monitored variables. The new SER target thus set is used for the SER comparison for the next frame. In step 65, the following equations are used to set the value of the SER target, $T_{SE}$, in accordance with the inventive concept:

$$\overline{CV_n} = \frac{\sqrt{\overline{SER^2_n} - (\overline{SER_n})^2}}{\overline{SER_n}}, \quad \text{and}$$

$$T_{SE_{n+1}} = S_{ref} g(\overline{CV_n} / f(\overline{T_{SE_n}})).$$

To prevent wild variations of the symbol error target, upper and lower limits, $S_{max}$ and $S_{min}$, may be placed on $T_{SE}$ (shown below). Similarly, the estimate $\overline{CV_n}$ may be bounded to limit its fluctuation.

The technique described above uses the coefficient of variation of the symbol error count to set the symbol error target. It should be noted that a similar scheme can be devised for setting the SE target using the standard deviation or the variance of the symbol error count.

Having described the general concept, an illustrative detailed description of an adaptive SER based ROLPC technique in accordance with the principles of the invention is now presented. The following definitions are used (some of these definitions are similar to those used in the above-described Fixed SER target ROLPC technique and are repeated here for convenience):

$S_{max}$=Upper limit on the symbol error target;

$S_{min}$=Lower limit on the symbol error target;

FER_target=Desired frame error rate;

$E_{nom}$=Nominal value of the $E_{bT}/N_{0T}$ target (in dB);

$S_{nom}$=Nominal value of the symbol error target;

$CV_{nom}$=Nominal value of the coefficient of variation of the SE count;

$E_{max}$=Upper limit on the $E_{bT}/N_{0T}$ target (in dB);

$E_{min}$=Lower limit on the $E_{bT}/N_{0T}$ target (in dB);

$A_0, A_1, \ldots, A_K$: K+1 integers arranged in an ascending order (to define symbol error intervals) with $A_0=0$, and $A_K=\infty$;

$M_1, M_2, \ldots, M_K$: K positive weight values arranged in an ascending order; $\beta_1, \beta_2, \beta_4, \beta_8$: De-emphasis factors for frame rates 1, ½, ¼ and ⅛ respectively, with $\beta_1=1$;

$\Delta$: Basic step size (in dB) for changes in the $E_{bT}/N_{0T}$ target;

$\delta_1, \delta_2, \delta_4, \delta_8$: Step sizes (in dB) in case of frame erasures when the last good frame rate is 1, ½, ¼ and ⅛, respectively;

$\alpha$: IIR filter constant;

$f(T_{SE})$: The empirically determined relationship between the coefficient of variation of symbol error count and the SER target under a fixed reference environment such as AWGN with the fixed SER target algorithm being used for ROLPC;

$g(x, FER\_target)$: Another empirically determined relationship between the ratio of SE targets that achieve FER_target in different environments and x, the ratio of corresponding SE CVs, for each given FER target; For a given FER_target (equal to FER_target), $g(x, FER\_target)$ represents the empirically determined relationship between the ratio of SE targets (in two different fading environments) that achieve the FER_target and the corresponding ratio of the symbol CVs (in those two environments).

$S_{ref}$(FER_target): Another empirically determined relationship showing the symbol error target at which the basic fixed SER target algorithm achieves the FER_target under the reference environment;

$T_{SE}$=Symbol error target;

$(T_{E_{bT}/N_{OT}})_n$=the $E_{bT}/N_{OT}$ target (in dB) for the $n^{th}$ frame;

Last_good_rate=The speech rate of the last frame received without an erasure;

d, L, are variables, or parameters;

$\overline{SER}_n$=estimated average SER after the $n^{th}$ frame;

$\overline{SER^2}_n$=estimated average square of SER after the $n^{th}$ frame; and $\overline{T_{SE_n}}$=estimated average symbol error target after the $n^{th}$ frame.

The following signal values are supplied by the receiver of the base station:

R=The reciprocal of the rate of the frame just processed and is equal to 0 if there is an erasure so that the rate information is lost; and $SE_n$=the symbol error count generated by the $n^{th}$ frame.

The following initialization is performed:

$T_{E_b/N_{0T}} = E_{nom}$;

$\overline{T_{SE_n}} = S_{nom}$;

$\overline{SER}_n = S_{nom}$;

$\overline{SER^2}_n = (S_{nom})^2(1+CV^2_{nom})$; and

Last_good_rate=1.

In accordance with the Adaptive SE count based ROLPC technique, the base station processor carries out the computations shown below to update the symbol error target and the $E_{bT}/N_{OT}$ target after the base station receiver has just finished processing a frame (and provided current values for R and $SE_n$). It should be noted that for simplicity, the subscript n, representing the $n^{th}$ frame has been dropped from some of the variables, e.g., the variable $SE_n$ is shown as SE.

If R>0;                                                                  (100)

{

SE ← SE × R;                                                             (101)

d = SE − $T_{SE}$;                                                       (102)

sgn(d) = sign of d;                                                      (103)

If d = 0, let L = 0;                                                     (104)

Else {find k such that $A_{k-1} < |d| \leq A_k$, let L = $M_k$;}         (105)

$T_{E_b/N_0} \leftarrow T_{E_b/N_0} + \text{sgn}(d)L_n\Delta/\beta_R$;    (106)

$\overline{SER} \leftarrow (1 - \alpha/\beta_R)\overline{SER} + (\alpha/\beta_R)SE$;  (107)

$\overline{SER^2} \leftarrow (1 - \alpha/\beta_R)\overline{SER^2} + (\alpha/\beta_R)SE^2$;  (108)

$\overline{T_{SE_n}} \leftarrow (1 - \alpha/\beta_R)\overline{T_{SE_n}} + (\alpha/\beta_R)T_{SE}$;  (109)

$CV = \dfrac{\sqrt{\overline{SER^2} - (\overline{SER})^2}}{\overline{SER}}$;  (110)

$T_{SE} = S_{ref}(\text{FER\_target})g(\overline{CV}/f(\overline{T_{SE}}), \text{FER\_target})$;  (111)

if $T_{SE} > S_{max}$, $T_{SE} = S_{max}$;                               (112)

if $T_{SE} < S_{min}$, $T_{SE} = S_{min}$;                               (113)

Last_good_rate = R;                                                      (114)

}

Else (i.e., if R equals 0 because of frame erasure)

{

R = Last_good_rate;                                                      (115)

$T_{E_b/N_0} \leftarrow T_{E_b/N_0} + \delta_R$;                         (116)

}

If $T_{E_b/N_0} > E_{max}$, $T_{E_b/N_0} = E_{max}$;                     (117)

if $T_{E_b/N_0} < E_{min}$, $T_{E_b/N_0} = E_{min}$;                     (118)

In step (100) of the above technique, the value of R, received from the base station receiver, is evaluated. A value of R greater than zero is representative of no erasure of the current received frame, while a value of R equal to zero indicates an erasure has occurred. If the value of R is equal to zero, then steps (115) and (116) are performed. In this case, the value of R is set equal to the value of the variable Last_good_rate in step (115). In step (116), the value of the $E_{bT}/N_{OT}$ target is updated for the next frame, n+1, by adjusting the current $E_{bT}/N_{OT}$ target by $\delta_R$ (as noted above, these are $\delta_1$, $\delta_2$, $\delta_4$, $\delta_8$, where R is either 1, 2, 4, or 8). Execution proceeds with step (117), described below. However, if at step (100) the value of R is greater than zero, steps (101) through (114) are performed.

In step (101), the symbol error count, SE, for the current frame is multiplied by the value of R to provide an adjusted value for the symbol error count, SE. In step (102), the variable, d, is set equal to the difference between the value of SE and the target symbol error count for the $n^{th}$ frame, $T_{SE}$. In step (103), the function sgn(d) is set equal to the sign of the variable, d. In step (104), if the value of the variable, d, is equal to zero, then the variable, L, is also set equal to zero and execution proceeds to step (106), described below. However, if the value of the variable, d, is not equal to zero, then the magnitude of the variable d is compared to a plurality of intervals, $A_k$, in step (105). The parameters $A_0=0, A_1, \ldots, A_{K-1}$, and $A_K=\infty$, define intervals such that if the magnitude of the difference between the actual symbol error count SE and the target $T_{SE}$ falls in the, say, $k^{th}$ interval, the variable L is set equal to the corresponding weight $M_k$. In step (106), the $E_{bT}/N_{OT}$ target is updated for the next frame, n+1, by adjusting the current $E_{bT}/N_{OT}$ target by the basic step size $\Delta$ multiplied, as shown, by the value of the variables L and divided by the value of the de-emphasis factor $\beta_R$ (as noted above, these are $\beta_1$, $\beta_2$, $\beta_4$, $\beta_8$, where R is either 1, 2, 4, or 8). Steps (107), (108) and (109) update the above-described monitored variables. Steps (110) and (111) set the value of the SE count target, $T_{SE}$, in accordance with the inventive concept. In steps (112) and (113), the SE count target, $T_{SE}$, is limited by the respective maximum and minimum values. In step (114), the value of the variable Last_good_rate is set equal to the value of R.

In steps (117) and (118), the $E_{bT}/N_{OT}$ target for the next frame is limited by the respective upper and lower limit values.

Performance of Adaptive SER Based ROLPC

Simulation results are presented to show how effectively the SE count based ROLPC with adaptive SER targets performs in different environments. Again, it should be noted that in these simulations full rate frames alone are used and that it is assumed that the rate information is never lost because of erasures. The same set of fading environments that were used to study the performance of the basic algorithm with a constant SER target are assumed. The parameters of the adaptive algorithm used in the simulation runs were as follows:

$S_{max}$=Upper limit on the SE count target, e.g., 30 (number of symbol errors/frame);

$S_{min}$=Lower limit on the SE count target, e.g., 5;

FER_target=Desired frame error rate, e.g., 1%;

$E_{nom}$=Nominal value of the $E_{bT}/N_{0T}$ target (in dB), e.g., 5 dB;

$S_{nom}$=Nominal value of the SER target, e.g., 15;

$CV_{nom}$=Nominal value of the SER coefficient of variation, e.g., 0.5;

$E_{max}$=Upper limit on the $E_{bT}/N_{0T}$ target (in dB), e.g., 10.5 dB;

$E_{min}$=Lower limit on the $E_{bT}/N_{0T}$ target (in dB), e.g., 3 dB;

$A_0=0$, $A_1=10$, $A_2=25$, and $A_3=\infty$;

$M_1=1$, $M_2=2$, and $M_3=4$;

$\beta_1, \beta_2, \beta_4, \beta_8$: De-emphasis factors for frame rates 1, ½, ¼ and ⅛ respectively, with $\beta_1=1$;

$\Delta$: Basic step size (in dB) for changes in the $E_{bT}/N_{0T}$ target, e.g., 0.05 dB; $\delta_1, \delta_2, \delta_4, \delta_8$: Step sizes (in dB) in case of frame erasures when the last good frame rate is 1, ½, ¼ and ⅛, respectively;

$\alpha$: IIR filter constant, e.g., 0.2;

$f(T_{SE})$: was determined by fitting an analytic curve to the relationship between the symbol CV and the SER target for the AWGN environment obtained from the earlier set of runs made with the basic control algorithm. In this simulation, an illustrative value is:

$$f(x)=10^{(5.0-x)\times(0.0152+(0.00045\times(25.0-x)))}.$$

g(x, FER_target): was approximated by the by the function:

$$g(y, 1)=1/y^2.$$

$S_{ref}$(FER_target): was approximated by the by the function $S_{ref}(0.01)=17$. (Or, equivalently, $S_{ref}(1\%)=17$.)

Table 1, below, shows the performance of the proposed SER based algorithm under a variety of fading conditions caused by different mobile speeds.

TABLE 1

Performance of the New SER Based Power Control Algorithm

| Speed (Mph) | FER (%) | Mean $E_b/N_0$ (dB) | Mean Target $E_b/N_0$ (dB) | Mean #SE per Frame | Std. Dev. | CV of SER |
|---|---|---|---|---|---|---|
| 3 | 0.96 | 4.1 | 3.79 | 19.7 | 11.9 | 0.60 |
| 8 | 1.4 | 4.98 | 4.51 | 14.0 | 14.9 | 1.06 |
| 15 | 2.16 | 6.68 | 5.65 | 11.1 | 17.0 | 1.53 |
| 30 | 1.64 | 10.1 | 8.75 | 9.86 | 14.5 | 1.47 |
| 45 | 1.22 | 10.1 | 8.72 | 10.7 | 13.5 | 1.26 |
| 60 | 1.26 | 9.04 | 7.88 | 1.21 | 13.0 | 1.07 |

Table 1 above shows the FER ranging between the narrow range of 1% and 2.2% for the fading environments considered. Thus, indicating that the proposed SE count based algorithm with adaptive SER targets does an admirable job of controlling the FER under widely varying fading conditions. Moreover, its speed is limited only by the speed of the IIR (infinite impulse response) filter used for variable monitoring. When the filter constant, $\alpha$, is at 0.2, the time constant associated with these filters is around 100 ms (milli-seconds) which should provide adequate speed for environment tracking. As such, the proposed technique with adaptive SER targets can control the FER very well without being encumbered by a slow tracking speed as the FER based ROLPC. It should be noted that, in effect, the Adaptive SE count Based ROLPC approach uses the coefficient of variation of the SE count as a "signature" of the environment and uses this signature to set the SER target appropriately. Similar schemes which use the standard deviation or the variance of the SER as signatures of the environment are also possible.

Other variations are also possible. For example, in the example above, it was assumed that the mobile station is communicating with a single base station. However, when the mobile station is in soft-handoff (communicating with multiple base stations), the symbol error count based control described herein may be performed within MSC 205. In particular, MSC 205 receives received frame information (including symbol error count) from each base station involved in soft-handoff with the mobile station. As known in the art, MSC 205 comprises a frame handler (not shown). The frame handler selects the received frame that has the best quality according to some predetermined criterion. (As just one simple example, the frame with the lowest symbol error count. However, other criteria can be used.) MSC 205 then performs the above-described a symbol error count based ROLPC technique with adaptive SER targets using the selected frame and transmits the results back to the base stations. As yet another alternative, each base station can perform its own SE count based control, in accordance with the principles of the invention, using their respective received frames.

As already noted above, the foregoing merely illustrates the principles of the invention and it will thus be appreciated that those skilled in the art will be able to devise numerous alternative arrangements which, although not explicitly described herein, embody the principles of the invention and are within its spirit and scope. For example, although the inventive concept was illustrated herein as being implemented with discrete functional building blocks, e.g., a controller, etc., the functions of any one or more of those building blocks can be carried out using one or more appropriately programmed processors, e.g., a digital signal processor; discrete circuit elements; integrated circuits; etc. In addition, the inventive concept is applicable to other cellular access schemes besides IS-95, power control of other signals received by the base station, and power control by the mobile station of signals received from the base station.

What is claimed:

1. A method for use in a cellular infrastructure, the method comprising the steps of:

receiving a signal from a mobile station; and responsive to the received signal, performing symbol error count based reverse outer loop power control with adaptive symbol error rate targets, including the steps of:

monitoring a symbol error count of the received signal for determining a standard deviation of the received symbol error count; and adjusting a target sigal-to-noise ratio for the received signal as a function of the standard deviation of the received symbol error count for use in providing the power control.

2. The method of claim 1 wherein in the performing step includes the steps of:

setting a target symbol error rate as a function of the standard deviation; and adjusting the target signal-to-noise ratio for the received signal depending on the difference between the set target symbol error rate and the actual symbol error count produced by the receiver.

3. A method for use in cellular infrastructure, the method comprising the steps of:

receiving received frame information from a number of base stations, the frame information corresponding to signals received by those base stations, where the source of the signals is a mobile station;

selecting that received frame that meets a predetermined selection criteria; and performing symbol error count based reverse outer loop power control with adaptive symbol error rate targets based on the selected frame for application to the mobile station, including the steps of:

monitoring a symbol error count associated with the selected frame for determining a standard deviation of the symbol error count: and adjusting a target signal-to-noise ratio for the corresponding received signal as a function of the standard deviation of the symbol error count for use in providing the power control.

4. The method of claim 3 wherein the performing step includes the steps of:

setting a target symbol error rate as a function of the standard deviation: and adjusting the target signal-to-noise ratio for the corresponding received signal depending on the difference between the set target symbol error rate and the actual symbol error count.

5. Apparatus for use in a cellular infrastructure, the apparatus comprising:

a receiver for receiving a signal from a mobile station: and a processor responsive to the received signal for performing symbol error count based reverse outer loop power control with adaptive symbol error rate targets, wherein the processor monitors a symbol error count of the received signal for determining a standard deviation of the received symbol error count; and adjusting a target signal-to-noise ratio for the received signal as a function of the standard deviation of the received signal error count for use in providing the power control.

6. The apparatus of claim 5 further comprising a transmitter for transmitting the power control information to the mobile station.

7. The apparatus of claim 5 wherein the processor sets a target symbol error rate as a function of the standard deviation; and adjusts the target signal-to-noise ratio for the received signal depending on the difference between the set target symbol error rate and the actual symbol error count produced by the receiver.

* * * * *